United States Patent [19]

Nudelman et al.

[11] 4,115,137

[45] Sep. 19, 1978

[54] METHOD OF PRODUCING CEMENT CLINKER FROM CHLORINE-CONTAINING RAW MIXTURE

[76] Inventors: Boris Izrailovich Nudelman, Chilanzar, kvartal 8, 27, kv. 48; Valentina Petrovna Sharova, Chilanzar, kvartal 11, 18, kv. 53; Grant Leonidovich Ter-Aganov, Kara-Kamysh, 2/4, 12, kv. 22; Lev Matveevich Sosenko, Chilanzar, kvartal 23, 69, kv. 4; Marsel Yanovich Bikbau, Junus-Abad B-2, 21, kv. 58, all of Tashkent; Vadim Alexandrovich Kulabukhov, Otkrytoe shosse, ulitsa 4 Armii, 29, korpus 11, kv. 46, Moscow; Valentin Vasilievich Sheludko, ulitsa 43 Armii, 7, kv. 68, Podolsk Moskovskoi oblasti; Ida Timofeevna Uvarova-Nistratova, ulitsa Vrevskaya, proezd 2, 11, Tashkent; Albert Pavlovich Simon, ulitsa Taneeva, 33, kv. 29, Tashkent; Boris Abramovich Perlin, Khamzinsky raion, ulitsa Koldirgach, 5, Tashkent; Mikhail Gavrilovich Chepkalenko, Tashavtomash, 2,22, kv. 24, Tashkent; Alevtina Anatolievna Gasanova, Chilanzar, kvartal 22, 1, kv. 24, Tashkent; Guzal Abdulkhaevna Galimova, Volgogradskaya ulitsa, 1, kv. 10, Tashkent; Rashida Gafievna Bodyagina, ulitsa Sh.Rustaveli, 43, kv. 52, Tashkent; Arnold Arnoldovich Kevvai, ulitsa Kara-Kamysh, 1/3, 51, kv. 42, Tashkent; Boris Samuilovich Albats, prospekt Vernadskogo, 117, kv. 28, Moscow; Gennady Andreevich Babin, ulitsa Vasilievskaya, 3, kv. 37, Moscow, all of U.S.S.R.

[21] Appl. No.: 796,666
[22] Filed: May 13, 1977
[51] Int. Cl.$^2$ .................................................. C04B 7/48
[52] U.S. Cl. ...................................... 106/100; 106/104
[58] Field of Search .................................. 106/100, 104

[56] References Cited

U.S. PATENT DOCUMENTS

| 3,826,664 | 7/1974 | Grylicki et al. | 106/104 |
| 4,001,031 | 1/1974 | McCord et al. | 106/100 |

*Primary Examiner*—J. Poer
*Attorney, Agent, or Firm*—Robert E. Burns; Emmanuel J. Lobato; Bruce L. Adams.

[57] ABSTRACT

The herein-proposed method of producing cement clinker from a chlorine-containing raw mixture, comprising the steps of introducing said mixture into a kiln, sintering of the mixture, removing chlorine-containing compounds from the resultant sinter by acting on the sinter with a steam-gas-and-air mixture, subsequently regenerating the chlorine-containing compounds and cooling the resultant clinker, is characterized by the fact that the sinter is suspended in the steam-gas-and-air mixture, and the regeneration of the chlorine-containing compounds is carried out by spraying the raw mixture in a stream of chlorine-containing flue gases.

24 Claims, No Drawings

METHOD OF PRODUCING CEMENT CLINKER FROM CHLORINE-CONTAINING RAW MIXTURE

BACKGROUND OF THE INVENTION

The present invention relates to the cement production, technology, and more particularly to a method of producing cement clinker from a chlorine-containing raw mixture.

The present invention can be used in the building materials industry for producing cement from standard raw materials as well as for the production of cements with various properties.

SUMMARY OF THE INVENTION

At present, conventional cement clinker is produced by various methods based on the interaction of calcium carbonate with alumina and silica at sintering temperatures of 1350° to 1500° C, followed by cooling of the sinter, resulting in the formation of a clinker with the desired properties.

Two main methods of clinker production include "wet" and "dry" procedures which mainly differ by the methods used for preparing a raw mixture. The "wet" method involves the preparation of a raw slime with its subsequent sintering in a kiln. The "dry" method involves the preparation of a dry raw mixture, for example, raw powder, with its subsequent preliminary thermal treatment by outgoing flue gases in a downstream heat exchanger before the introduction of the mixture in a kiln.

The sintering is usually performed in a rotary kiln, but stationary kilns can be used as well. Fuel oil, fuel gas or solid fuel is combusted in a kiln in order to heat it up to the required temperature.

Roasting of cement clinker requires significant heat consumption and, consequently, significant fuel consumption. Grinding of clinker to cement requires significant consumption of electric power also due to the high density of the clinker granules. The net cost of clinker is especially influenced by high fuel consumption due to high fuel costs in a period of energy crisis.

The increasing demand in cement stimulates the search for more economical methods of its production preferably by significant increase in the productive capacities of working plants and those in the stage of design and by decreasing energy consumption of cement production.

One of the ways to achieve these objectives is to provide a method of cement clinker production at low roasting temperature resulting in a clinker which can be easily ground.

There is known a method of decreasing of the roasting temperature by introducing significant amounts of chlorine-containing compounds, for example calcium chloride, in a raw mixture.

The roasting of such raw mixtures is accompanied by the formation of a salt melt which serves as the main reaction medium. The chemical composition and the physical properties of the melt allow completing the reactions of mineral formation at temperatures in the range of 900° to 1200° C instead of the usual temperatures of 1350° to 1500° C. The formed sinter is subsequently cooled.

The decrease of the roasting temperature results in a significant decrease of energy consumption during the clinker formation.

There is known also a more progressive method of clinker production from a chlorine-containing raw mixture involving the addition into the mixture of calcium chloride in an amount of from 10 to 20 weight % in terms of a decarbonized raw mixture. The temperature of the roasting of this raw mixture can be decreased to 900° to 1200° C, but the amount of chlorine-containing compounds in the sinter is higher than that maximum permissible for the production of clinker with the required physical and chemical characteristics. To remove these chlorine-containing compounds from the sinter, the layer of the sinter is treated with a steam-gas-and-air mixture at the sintering temperature before the cooling of the sinter. The contact of sinter particles with the steam-gas-and-air mixture results in thermal decomposition of the chlorine-containing compounds and the evolution of hydrogen chloride. The hydrogen chloride mixes with flue gases which have formed as a result of fuel combustion. A part of the hydrogen chloride is absorbed into the surface layer of the material and interacts with the carbonate compounds present in the raw mixture, giving chlorides, for example calcium chloride. On the other hand, the hydrogen chloride is absorbed by light particles of the material, which are fluidized in the flue gases and reacts with the formation of chlorine-containing compounds therein. These compounds are deposited together with the dust on the surface layer of the raw mixture, which results in a partial return of the compounds to the process, i.e. in their regeneration. Another part of the chlorine-containing compounds is carried away to the atmosphere together with the flue gases. The abovesaid method has certain disadvantages. When the layer of the sinter is treated with the steam-gas-and-air mixture it is in a state of slow movement due to e.g. slow rotation of the kiln. For this reason heat- and mass-transfer in the layer is relatively inefficient because of poor intermixing of the raw material and the steam-gas-and-air mixture. That is why a prolonged period is necessary to remove the chlorine-containing compounds down to the given residual level, and this descreases the productive capacity of a kiln. Other means of effective removal of the chlorine-containing compounds involves an increase of the size of a kiln, which calls for additional investments.

Another disadvantage of the abovesaid method is that through the limited contact of hydrogen chloride with the raw material the amount of regenerated chlorine-containing compounds does not exceed 30%. Moreover, the largest part of chlorine-containing compounds is carried away by flue gases to the atmosphere, causing environment pollution. The hydrogen chloride present in a kiln exists both in a gaseous form and in an acid form due to its condensation on the cold metal surfaces, for example, in heat exchangers, which results in metal corrosion. Still another disadvantage of the abovesaid method is that because of incomplete regeneration of the chlorine containing compounds in the process their deficiency must be compensated by adding some amount of the chlorine-containing component into the initial raw mixture, which results in additional material expenses.

It is an object of the present invention to eliminate these disadvantages.

The main object of the present invention is to provide a method of production of cement clinker from a chlorine-containing raw mixture, which is characterized by an effective removal of chlorine-containing compounds from the sinter and by their maximum regeneration.

Another object of the present invention is to provide a method which allows the production of sinter with a desirable granulometric composition providing maximum contact with the steam-gas-and-air mixture.

It is a further object of the present invention to provide a method of establishing a gaseous medium which suspends the sinter, thus providing intensive heat- and mass-transfer in the layer thereof.

A still further object of the present invention is to provide a method which will simplify the admission of fuel into the sinter layer.

It is a yet further object of the present invention to provide a method with the use of fuel oil in a rotary kiln, whereby the process of the removal of chlorine-containing compounds from the sinter is intensified due to the chemical and physical interaction of the fuel oil and raw material.

It is a still further object of the present invention to provide a method for producing cement clinker from a chlorine-containing raw mixture, wherein the regeneration of chlorine-containing compounds is accelerated through the utilization of the heat of chlorine-containing effluent gases.

Still another object of the present invention is to provide a method in which the regeneration of chlorine-containing compounds is intensified by increasing the contact surface of the raw material and chlorine-containing flue gases.

It is a further object of the present invention to provide a method, whereby the process of regeneration of chlorine-containing compounds is simplified by spraying the raw mixture in a stream of chlorine-containing flue gases.

It is still a further object of the present invention to provide a method, whereby the intensification of the regeneration of chlorine-containing compounds is attained by aerodynamic and thermal interaction of the raw material and chlorine-containing flue gases.

These and other objects are achieved by providing a method whereby, in the course of introduction of a chlorine-containing mixture into a kiln, its sintering, and the removal of chlorine-containing compounds from the resultant sinter by treating its layer with a steam-gas-and-air mixture, followed by regeneration of the chlorine-containing compounds, and the cooling of the formed clinker, according to the invention, the sinter is suspended in the steam-gas-and-air mixture, and the regeneration of the chlorine-containing compounds is carried out by spraying the raw mixture in a stream of chlorine-containing flue gases.

DESCRIPTION OF THE INVENTION

It is expedient to grind the sinter down to particle size not exceeding 20 mm.

As the steam-gas-and-air mixture the fuel combustion products can be used.

Some amount of steam can be introduced directly under the layer of the sinter in addition to the combustion gases.

The fuel combustion products can be introduced into the layer of the sinter at a certain angle.

If the clinkering process is carried out in a rotary kiln operating on fuel oil it is expedient to introduce the fuel oil into the kiln in a direction opposite to that of the kiln rotation.

The fuel oil can be introduced in the rotary kiln along its axis onto the surface of the sinter layer.

It is expedient to carry out the regeneration of chlorine containing compounds by spraying the raw mixture in the stream of the chlorine-containing flue gases at a temperature of 200° to 1000° C.

The spraying of the raw mixture in the stream of the chlorine containing flue gases can be performed by blowing compressed gases through the layer of the raw mixture.

The raw mixture can be blown through with air or a flue gases.

If the process is carried out in a rotary kiln, it is expedient to spray the raw mixture in the stream of chlorine-containing flue gases along the axis of the kiln.

If the process is carried out in a kiln equipped with a downstream heat exchanger, it is expedient to spray the raw mixture in the stream of the chlorine-containing flue gases in the heat exchanger. The stream of the chlorine-containing flue gases in this case can be turbulized.

The essence of the present invention is as follows.

A raw mixture of alumina, carbonate, silica and ferric components is mixed with a chlorine-containing compound, for example, calcium chloride, and is transferred into a kiln, wherein the stages of drying, heating and decarbonization are carried out in a conventional manner.

The next stage of roasting, i.e. sintering, is carried out at a temperature of 900° to 1200° C. The sinter, before cooling thereof, is treated with a steam-gas-and-air mixture to remove excess chlorine-containing compounds. During the procedure the temperature of the sinter layer is maintained constant and equal to 900° to 1200° C for 3 to 20 minutes by combusting fuel in the layer.

The interaction of the sinter particles with the water vapours present in the combustion gases results in thermal decomposition of chlorine-containing compounds with the formation of calcium oxide and hydrogen chloride. The calcium oxide is present in the sinter in bonded form.

To intensify the process of the removal of chlorine-containing compounds from the sinter, the latter is brought to a suspended state by blowing a steam- gas-and-air mixture through its layer. The blowing results in vigorous intermixing of solid and gas phases in the suspension and in intensification of heat- and mass-transfer, which facilitates the removal of chlorine-containing compounds from the sinter.

For an additional increase of the contact of the sinter particles their size is reduced to a value which does not exceed 20 mm, preferably 3 to 5 mm.

Some amount of steam can be admitted under the sinter layer during the blowing of the steam-gas-and-air mixture through the layer. It can be done by feeding water into the sinter layer. Cracks and microcracks formed on the incandescent particles of the sinter increase the surface of their contact with the gas phase.

It is possible also to introduce the products of fuel combustion at a certain angle to the sinter layer, into which the steam-and-air mixture was previously admitted. In this case the clinker layer is suspended both by the steam and air mixture and by the combustion products.

If the clinkering process is carried out in a rotary kiln fed with fuel oil (heavy oil), it is expedient to introduce the oil in the direction opposite to that of the kiln rotation. In this case air required for the combustion of fuel is admitted to the zone of oil feed. The liquid fuel intermixes with the sinter particles and, being oxidized with air burns out on the surface of the sinter particles. This significantly activates heat- and mass-transfer process.

It is also possible to introduce the fuel oil (heavy oil) along the rotating kiln onto the surface of the sinter layer.

The fuel is admitted to the sinter layer in a coarse dispersed state and is carried into the layer in the course of its rotation; it is vigorously mixed with the sinter particles and burns on their surfaces. This procedure simplifies the introduction of fuel into the sinter layer and intensifies heat- and mass-transfer.

The sinter after the removal of chlorine-containing compounds therefrom is a quality clinker, which can be cooled by any suitable method and after mixing with specific ingredients can be ground to produce cements with the desired properties.

Hydrogen chloride is one of the products of thermal decomposition of the chlorine-containing compounds. After mixing with flue gas it reacts with the carbonate compounds of the raw material in the kiln. The raw mixture is suspended in the stream of a chlorine-containing gas in order to intensify the regeneration of chlorine-containing compounds in the mixture. It is expedient to perform this suspension in the stream with a temperature of 200°–1000° C because the absorption of chlorine-containing gas by the raw mixture is especially effective in this temperature range.

It is preferable to introduce the raw mixture into the gas stream with the highest temperature, for example in the zone close to the discharge part of the rotary kiln. This results in an increase of the contact time of the chlorine-containing flue gas with the raw material and, consequently, in an increase of the regeneration conversion.

The essence of the invention will be better understood from a consideration of the examples presented hereinbelow to illustrate specific embodiments of the herein-proposed method.

EXAMPLE I

A chlorine-containing raw mixture was preliminarily heat treated in a kiln, and after that it was sintered in a rotary kiln at a temperature of 1120° C, till a granular sinter was obtained, containing up to 50% of granules with diameter over 20 mm. Chlorine content in the sinter was 6.6%. The structure of the sinter had low porosity, 40 to 45%.

Immediately after the sintering zone 40% of the fuel gas (of the total amount of fuel necessary for roasting) was admitted into the kiln by means of special burners, together with compressed air (air comsumption coefficient $\alpha = 2$). The exit velocity of the air-gas mixture jets was 150 m/sec. In addition, water was introduced under the sinter layer (200 g. of water per kg. of the sinter).

As a result, the sinter layer was suspended by the steam-gas-and-air mixture.

The abovesaid buring of fuel gas and the admission of water produced a quantity of steam sufficient for a rapid course of reactions of thermal decomposition of $CaCl_2$ which allowed removal of chlorine and hydrogen from the sinter with the formation of gaseous hydrogen chloride. The water admitted into the incandescent sinter layer also contributed to cracking of large granules whereby the area of the contact surface of the gas and solid phases sharply increased.

The duration of the heat treatment of the sinter in suspended state in the rotary kiln was 6 min. The heat of fuel combustion made it possible to keep the temperature of the layer constant at the level of 1100° C for 6 min. This heat was spent to compensate for heat losses, water evaporation and the endothermic reaction of $CaCl_2$ decomposition.

After the treatment in the suspended state the sinter containing 3.3% of $Cl_2$ was introduced at a temperature of 1100° C in a grinder and subsequently in a stationary fluidized bed apparatus. In this case introduced into the sinter layer were 10% of gas at $\alpha = 2$ and water in an amount of 50 g/kg of the sinter, the velocity of the gas- and air mixture admission into the layer being 150 m/sec.

After the final treatment in the suspended state under the conditions of effective heat- and mass-transfer the final content of $Cl_2$ in the sinter was on the order of 1.5%. After the removal of chlorine-containing compounds to the desirable level (in this case to 1.5%) the resultant quality clinker was cooled by a conventional method in a clinker cooler of a conventional design.

EXAMPLE 2

A chlorine-containing raw mixture was preliminarily heat treated in a kiln. After that it was sintered in a rotary kiln at a temperature of 1000° C, giving a granulous sinter containing up to 40% of granules with a diameter over 20 mm. The content of $Cl_2$ in the sinter was on the order of 6.6%.

The granules had low porosity of 40 to 45%.

After the sintering zone 15% of the fuel gas (of the total amount of fuel necessary for sintering) was admitted under the sinter layer together with air ($\alpha = 1.5$) and water (75 g. per kg. of sinter). The velocity of the air-gas mixture at the outlet of the nozzles of burners was on the order of 75 m/sec. As a result the sinter layer was suspended in the gas mixture and was treated at a constant temperature (on the order of 1000° C) in the rotary kiln for 6 min. After the treatment the sinter containing 5.1% of chlorine was ground to the granule size of 10 to 15 mm and subsequently heat treated in a fluidized bed apparatus. The parameters of the heat treatment were:

| | |
|---|---|
| Temperature of the sinter layer | 1000° C |
| Amount of fuel gas introduced into the sinter layer | 10% of the total amount for roasting |
| Air consumption coefficient during gas burning ($\alpha$) | 1.5 |
| Velocity of the air-gas mixture at the outlet of a burner nozzles | 75 m/sec. |
| Amount of water introduced into the sinter layer | 50 g. per kg. of clinker |
| Duration of the thermal treatment in the fluidized bed apparatus | 10 min. |

After the final thermal treatment in the fluidized bed apparatus high quality clinker was obtained with the final content of $Cl_2$ equal to 1.9%. It was cooled by a conventional method.

EXAMPLE 3

A granulated chlorine-containing raw mixture with granules size of 5 to 10 mm was preliminarily heat treated in a kiln.

After that it was sintered in a rotary kiln at a temperature of 900° C, giving a granulous sinter containing up to 17% of granules with a diameter over 10 mm. The content of $Cl_2$ in the sinter was on the order of 7.45%.

The granules had high porosity of up to 60%. After the sinter zone I to 1.5% of the fuel gas (of the total amount of fuel necessary for roasting) were introduced under the sinter layer together with air for the gas burning ($\alpha$ = I) and water (5 g.per kg. of the sinter). The velocity of the air-gas mixture at the outlet of the burner nozzles was 10 m/sec.

As a result a local suspended layer was formed in the vicinity of the inlet of the air-gas mixture. The final content of $Cl_2$ in the clinker obtained had to be 4.8 to 4.3%. Due to the high porosity of the material the rate of removal of chlorine-containing compounds from the sinter layer was intensive enough even without addition of significant amount of the air-gas mixture into the layer.

The removal of chlorine-containing compounds from the layer and the maintenance of a high temperature in it (on the order of 900° C) for 10 minutes was carried out with the help of the main flame jet of the rotary kiln. The flame jet was directed in such a fasion that its gases penetrated the outmost layer of the product. The content of chlorine-containing compounds in the clinker formed was controlled by the burning of fuel gas.

The final chlorine content in this case was 4.9%.

The resultant clinker was cooled by a conventional method.

EXAMPLE 4

A chlorine-containing raw mixture was preliminarily heat treated, and subsequently sintered in a rotary kiln at a temperature of 1100° C, resulting in sinter containing up to 45% of granules with a diameter over 20 mm. The content of $Cl_2$ in the sinter was on the order of 6.6%. The granules had low porosity of 35 to 40%.

After the sintering zone a steam and air mixture was introduced under the sinter layer (100 g. of water per kg. of sinter).

In addition to the main burner of the kiln arranged along its axis, another burner was arranged at 45° to the sinter layer through which 10% of the total amount of fuel and air ($\alpha$ = I.I) was fed. An additional amount of air was admitted under the sinter layer so that in the total air consumption coefficient for the second burner be equal to 2.

The steam-and-air mixture and the products of fuel burning introduced into the layer through the surface thereof brought the sinter granules into suspended state. This heat treatment at constant temperature was carried out for 6 min. The content of $Cl_2$ at the kiln outlet was 4.2%.

The sinter was further ground and then heat-treated in a fluidized apparatus. The parameters of this heat treatment were as follows:

| | |
|---|---|
| Temperature of the sinter layer | 1100° C |
| Amount of the fuel gas admitted into the layer | 10% |
| Air consumption coefficient when burning the gas ($\alpha$) | 2 |
| Velocity of the air-gas mixture at the outlet of burner nozzles | 75 m/sec. |
| No water was admitted into the layer in the outlet apparatus. | |
| Duration of thermal treatment in the outlet apparatus | 10 minutes. |

After the heat treatment of the suspended sinter layer in the outlet fluidized bed apparatus, a high-quality clinker was obtained with the final content of $Cl_2$ equal to 2.1%.

The resultant clinker was cooled by a conventional method.

The above-given example demonstrates one of the possible versions of heat treatment in a rotary kiln for the removal of chlorine-containing compounds with a simplified feed of fuel combustion products into the sinter layer. This procedure allows a significant decrease of investments for manufacturing a device for feeding fuel and air into the kiln.

EXAMPLE 5

A chlorine-containing raw mixture was preliminarily heat treated and then sintered in a rotary kiln at a temperature of 1100° - 1150° C, giving granulous sinter containing up to 30% of granules with a diameter over 20 mm.

The content of $Cl_2$ in the sinter was 5%.

The granules had low porosity of 35 to 40%.

Immediately after the sintering zone the sinter layer was treated with a flame jet. 2% of the fuel were burned at $\alpha$ = 1.1. The flame jet was directed at an angle of 40° to the sinter layer. The duration of the treatment in the kiln after the completion of the sintering process was 2-3 minutes.

The sinter with the content of $Cl_2$ equal to 4% was subsequently ground to grain size not over 0.5 mm and then introduced in a shaft-type heat exchanger. Flue gases from the kiln containing water vapors were admitted towards the sinter granules falling into the shaft.

The temperature in the shaft was kept constant, on the order of 1100° C, by burning 3% of the fuel in panel burners. The duration of the heat treatment in a suspended state was 1.5 minutes.

The final content of $Cl_2$ in the high-quality clinker at the outlet from the shaft was 2%.

The above-given example demonstrates the application of a highly effective process or treating sinter in a suspended state for the removal of chlorine-containing compounds. The process was carried out in the presence of a large quantity of water vapors and utilizes the heat of flue gases of a kiln.

This procedure can find application in the processes involving "dry" or combined methods of cement clinkering.

EXAMPLE 6

A chlorine-containing raw mixture was granulated to particles with a diameter of 5 to 10 mm and after preliminary heat treatment it was sintered in a rotary kiln at a temperature of 1100° to 1150° C to produce granulous sinter containing up to 80% of granules with a diameter of 3 to 7 mm.

The $Cl_2$ content in the sinter was 5.1%.

After sintering the granules with a temperature of 1100° to 1150° C were introduced through discharge openings into drums of a planetary cooler, lined with fire-proof facing. No grinding of the sinter was performed.

An air-gas mixture was admitted into the drums through special burners with nozzles directed at 90° to the layer surface, and 15% of the fuel gas was burned there with $\alpha$ = 2. In addition, water was introduced into the sinter layer (150 g. per kg. of sinter). The stream of the air-gas mixture suspended the granulated sinter and it was treated in this state at a constant temperature of 1100° to 1150° C for 6 min. The final content of chlorine in the quantity clinker was 2.5%.

Subsequently the clinker was cooled by a method specific to planetary coolers.

EXAMPLE 7

A chlorine-containing raw mixture formulated for the preparation of white clinker was granulated to granules with a diameter of 5 to 10 mm and was preliminarily heat treated.

After that it was sintered in a rotary kiln at a temperature of 1100° to 1150° C to produce granulous sinter containing more than 85% of granules with a diameter of 3 to 7 mm. The content of $Cl_2$ in the sinter was 4.9%. After sintering, the granules were treated with a flame jet directed at an angle of 35° to the sinter layer at a temperature of 1000° to 1050° C. The consumption of fuel gas was 10% of the total amount of fuel necessary for roasting and air consumption coefficient $\alpha$ was 0.95. In addition, water vapours were introduced into the sinter (50 g. per kg. of sinter).

Subsequently the sinter was introduced through the discharge openings of the kiln into a shaft-type heat exchanger assembled at the discharge outlets.

In the shaft-type heat exchanger the sinter was brought into suspended state by feeding into the layer 10% of fuel, air ($\alpha = 0.9$) and water (200 g. per kg. of sinter). The temperature of the sinter layer was kept constant (on the order of 1000° C) for 10 minutes, after which the clinker was cooled by a conventional method. The content of $Cl_2$ in the final white clinker was 1.5%.

EXAMPLE 8

Fuel oil (heavy oil) was admitted into a rotary kiln in a region of the removal of chlorine-containing compounds close to the discharge end of the kiln over a span of 8 m long. The fuel amounting to 20% of the total quantity of fuel was introduced in the form of nonturbulent streams along the axis of the sinter movement on the lower part of the sinter slope. The air for the fuel combustion ($\alpha = 1.8$) was admitted through nozzles under the sinter layer in the region of the fuel feed.

The feed of the fuel in the form of nonturbulent streams did not allow all the fuel to burn out on the surface of the material.

In this case heavy fractions of the fuel burned inside the layer, which provided large contact of the material with the combustion products. This resulted in an increase of the sinter temperature and facilitated the intensive evolution of chlorine-containing compounds from the sinter.

EXAMPLE 9

A chlorine-containing raw mixture was preliminarily heat treated and subsequently sintered in a rotary kiln at a temperature of 1200° C to produce granulous clinker containing more than 50% of granules with a diameter over 20 mm.

The content of $Cl_2$ in the sinter was 6%. The granules had low porosity of 35 to 40%.

Immediately after sintering the product was ground to the granule size of 5 to 10 mm and was introduced into a fluidized-bed heat exchanger of cascade type (with the linear arrangement of reactors).

The sinter granules were suspended there by burning in their layer 30% of fuel of the total fuel consumption necessary for roasting the clinker. The air consumption coefficient was 1.8. The velocity of an air-gas mixture entrance into the layer was 100 m/sec. In addition, water was introduced into the sinter layer (100 g. per kg. of sinter).

The duration of the heat treatment of the sinter in suspended state was 14 minutes.

The final content of $Cl_2$ in the clinker was 1.9%. The clinker was cooled by a conventional method.

EXAMPLE 10

Finely dispersed components of a raw mixture containing $CaCO_3$ and CaO were introduced into flue gases containing 2.5% of HCl (of the total volume of the flue gases) in the course of removal of chlorine-containing compounds from the sinter. This blowing was carried out in the region of a kiln volume with the average gas temperature of 1000° C by blowing the sinter layer with compressed air having a temperature of 150° C and velocity of 200 m/sec through nozzles fixed in the lining of the kiln. The contact surface of the material with the gas phase had the area of 100 $m^2/m^3$. The contact time was 3 sec.

After this interaction of HCl with carbonate compounds the content of HCl in the gases was less than 0.005% and chlorine-containing compounds were returned in the raw mixture in the form of $CaCl_2$.

EXAMPLE 11

Hydrogen chloride was admixed with flue gases in the course of removal of chlorine-containing compounds from the sinter. The content of HCl was 1.5% of the total volume of the gas. The finely ground fraction of a raw mixture was sprayed in the gas stream in the region of the kiln volume with the average temperature of 700° C. The spraying was carried out by blowing of the layer with compressed flue gases having a temperature of 200° C and the velocity of 20 m/sec. The contact surface area of the material with the gas phase was 20 $m^2/m^3$. The contact time was on the order of 1.5 sec.

After this interaction of hydrogen chloride with the carbonate-containing material for 1.5 sec. the final content of hydrogen chloride in the flue gases was less than 0.01%.

EXAMPLE 12

Hydrogen chloride was admixed with flue gases in the course of removal of chlorine-containing compounds from the sinter. Its content in the inlet part of a kiln with the average gas temperature of 200° C was 0.2% of the total volume of the flue gases. A raw mixture layer in the same region of the kiln was blown with compressed air having a temperature of 100° C and the feed rate of 100 m/sec.

During this procedure finely dispersed particles of the raw mixture were sprayed in the stream of chlorine-containing gases.

The contact surface area of the material with the gas phase was 70 $m^2/m^3$ and the contact time was 0.5 sec. After this interaction of HCl with carbonate-containing compounds for 0.5 sec. the final content of HCl in the flue gases was less than 0.01%.

EXAMPLE 13

Hydrogen chloride was admixed with flue gases in the course of removal of chlorine-containing compounds from the sinter. Its content in the gases at the outlet from a kiln to a downstream heat exchanger means a shaft or cyclones was on the order of 2%.

The average temperature of the gases in the downstream heat exchanger was on the order of 300° C.

Dry raw powder with a temperature of 200° C was sprayed in the stream of chlorine-containing gases. The contact time was 8 sec. and the contact surface area of the gas phase with the material was 15 m²/m³. After this interaction of HCl with carbonates for 8 sec. the final content of HCl was less than 0.005%.

EXAMPLE 14

Hydrogen chloride was admixed with flue gases in the course of removal of chlorine-containing compounds from the sinter. Its content in the gases at the outlet to a downstream dust trap was 0.2%. The average temperature of the gases was on the order of 200° C. Raw slime with a temperature of 20° C and humidity of 37% was introduced in the stream of chlorine-containing gases in dispersed state. The contact time of particles of the raw material with the gas was 3 sec. The area of the contact surface was 20 m²/m³. After this contact for 3 sec. the final content of HCl was less than 0.005%.

Regeneration of chlorides took place as a result of return of $CaCl_2$ into the process.

EXAMPLE 15

Hydrogen chloride was admixed with flue gases in the course of removal of chlorine-containing compounds from the sinter. Its content in the gases at the outlet to a downstream heat exchanger was 1.1%. The average temperature of the gases was 250° C.

Dust from an electric filter with a temperature of 100° C was sprayed in the stream of chlorine-containing gases. The contact time was 5 seconds and the contact surface area was 30 m²/m³.

After this interaction for 5 seconds the final content of HCl was less than 0.005%.

EXAMPLE 16

When regeneration of chlorine-containing compounds was carried out in a kiln equipped with a downstream heat exchanger, the stream of exit chlorine-containing gases was turbulized in the heat exchanger. The turbulization was carried out at $Re = 8 \cdot 10^3 - 4 \cdot 10^6$ without increase in the volume of the flue gases by feeding the gases in two streams towards each other with the rate 20 to 200 m/sec. A raw mixture (cement raw powder) was introduced into the turbulized stream. The method was tested in a tank with a height of 3 m and a diameter of 0.7 m to make the turbulent stream with $Re = 1 \cdot 10^6$. The regeneration degree was measured along the height of the tank after every 0.5 m.

Completion of the reactions of mineral formation at temperatures in the range 1000° to 1100° C instead of usual temperatures of 1400° to 1500° C allows a significant decrease of energy consumption in the process of producing cement clinker and an increase in the efficiency of thermal units.

The application of the present invention allows an increase in the productive capacity of rotary kilns by up to 50% and more.

Specific fuel consumption for clinkering can be decreased by 30 to 40%.

Moreover, the study of grinding of different clinkers demonstrates that the clinker synthesized in the salt melt of calcium chloride at a relatively low temperature can be ground 3 to 4 times faster than the conventional clinker synthesized in a silicate melt. This offers considerable savings in energy for clinker grinding.

The changing of operating cement works to the technology according to the present invention could guarantee a significant increase of cement production. The net cost of clinker then can be decreased by 15 to 20%.

What is claimed is:

1. In a method of producing cement clinker from a chlorine-containing raw mixture, wherein a cement clinker raw mixture including chlorine containing compounds is introduced into a kiln and is sintered in said kiln forming a sinter layer and thereafter producing said clinker, the steps comprising
   after sintering said raw mixture introducing a steam-gas-and-air mixture into said kiln into contact with said sinter layer, at such a rate as to suspend said sinter layer in said steam-gas-and-air mixture and to remove chlorine-containing compounds from said sinter by thermal decomposition,
   regenerating said chlorine-containing compounds by spraying the raw mixture used to produce said clinker prior to sintering in a stream of chlorine-containing flue gases and
   after treatment with said steam-gas-and-air mixture, cooling the resultant clinker.

2. A method as claimed in claim 1, wherein said sinter is ground to a particle size not exceeding 20 mm.

3. A method as claimed in claim 1, wherein the products of fuel combustion in an amount of about 1 to 40% of the total fuel used for sintering are used as the steam-gas-and-air mixture at an air coefficient $\alpha$ of about 0.95 to 2.

4. A method as claimed in claim 3, wherein steam is introduced directly under the sinter layer in addition to the combustion gases in an amount of about 5 g. to 200 g. of water per kg. of sinter.

5. A method as claimed in claim 1, wherein the products of fuel combustion are introduced into the sinter layer at an angle of about 35° to 90°.

6. A method as claimed in claim 3, wherein the products of fuel combustion are introduced into the sinter layer at an angle of about 35° to 90°.

7. A method as claimed in claim 4, wherein the products of fuel combustion are introduced into the sinter layer at an angle of about 35° to 90°.

8. A method as claimed in claim 1, wherein, the process is carried out in a rotary kiln operating on liquid fuel and the liquid fuel is introduced into the kiln in a direction opposite to that of the rotation of the kiln.

9. A method as claimed in claim 3, wherein, the process is carried out in a rotary kiln operating on liquid funnel and the liquid fuel is introduced into the kiln in a direction opposite to that of the rotation of the kiln.

10. A method as claimed in claim 4, wherein, the process is carried out in a rotary kiln operating on liquid fuel and the liquid fuel is introduced into the kiln in a direction opposite to that of the rotation of the kiln.

11. A method as claimed in claim 1, wherein, the process is carried out in a rotary kiln operating on liquid fuel and the liquid fuel is introduced along the axis of the kiln onto the surface of the sinter layer.

12. A method as claimed in claim 3, wherein, the process is carried out in a rotary kiln operating on liquid fuel and the liquid fuel is introduced along the axis of the kiln onto the surface of the sinter layer.

13. A method as claimed in claim 4, wherein, when the process is carried out in a rotary kiln operating on liquid fuel and the liquid fuel is introduced along the axis of the kiln onto the surface of the sinter layer.

14. A method as claimed in claim 1, wherein spraying of the raw mixture is carried out in a stream of chlorine containing flue gases having a temperature of 200° to 1000° C.

15. A method as claimed in claim 1, wherein spraying of the raw mixture in the stream of chlorine-containing flue gases with a contact surface of about 15 to 100 m.$^2$/m.$^3$ is performed by blowing compressed gas through the layer of the raw mixture.

16. A method as claimed in claim 14, wherein spraying of the raw mixture in the stream of chlorine-containing flue gases with a contact surface of about 15 to 100 m.$^2$/m.$^3$ is performed by blowing compressed gas through the layer of the raw mixture at a nozzle velocity of about 20 to 100 m./sec.

17. A method as claimed in claim 16, wherein blowing is carried out with air.

18. A method as claimed in claim 16, wherein blowing is carried out with flue gases.

19. A method as claimed in claim 1, wherein, when the process is carried out in a rotary kiln and spraying of the raw mixture in the stream of chlorine-containing flue gases is performed along the axis of the kiln.

20. A method as claimed in claim 14, wherein, the process is carried out in a rotary kiln and spraying of the raw mixture in the stream of chlorine-containing flue gases is performed along the axis of the kiln.

21. A method as claimed in claim 1, wherein spraying of the raw mixture in the stream of chlorine-containing flue gases is carried out in a downstream heat exchanger.

22. A method as claimed in claim 21, wherein the stream of chlorine-containing flue gases is turbulized.

23. A method as claimed in claim 1 wherein said sinter layer is contacted with a steam-gas-and air mixture containing combustion fuel in an amount of about 1 to 40% of the total fuel used for sintering and wherein the temperature of said sinter layer is maintained constant at about 900° to 1200° C. for about 3 to 20 minutes by combusting said fuel in said layer.

24. A method as claimed in claim 14 wherein said raw mixture is contacted with said flue gases for a period of about 0.5 to 8 minutes.

* * * * *